United States Patent [19]

Valint, Jr. et al.

[11] Patent Number: 5,681,510

[45] Date of Patent: Oct. 28, 1997

[54] METHOD FOR TREATING PLASTIC MOLD PIECES

[75] Inventors: Paul L. Valint, Jr., Pittsford; Makarand G. Joshi, Rochester; Dominic V. Ruscio, Webster, all of N.Y.

[73] Assignee: Bausch & Lomb Incorporated, Rochester, N.Y.

[21] Appl. No.: 322,661

[22] Filed: Oct. 13, 1994

[51] Int. Cl.$^6$ .................................................. B29D 11/00
[52] U.S. Cl. .................................. 264/2.5; 264/102
[58] Field of Search ............... 264/2.3, 2.5, 2.6, 264/101, 102; 425/808

[56] References Cited

U.S. PATENT DOCUMENTS

| | | |
|---|---|---|
| 2,911,678 | 11/1959 | Brunfeldt ............................ 264/102 |
| 3,422,168 | 1/1969 | Bowser . |
| 3,423,488 | 1/1969 | Bowser . |
| 4,054,624 | 10/1977 | LeBoeuf et al. . |
| 4,113,224 | 9/1978 | Clark et al. ........................... 249/105 |
| 4,129,628 | 12/1978 | Tamutus . |
| 4,284,591 | 8/1981 | Neefe ................................... 264/2.5 |
| 4,540,532 | 9/1985 | Petcen et al. ........................ 264/1.1 |
| 4,732,714 | 3/1988 | Wichterle . |
| 5,230,840 | 7/1993 | Nishiguchi et al. ................. 264/102 |
| 5,254,000 | 10/1993 | Friske et al. ........................ 264/2.3 |
| 5,435,943 | 7/1995 | Adams et al. ....................... 264/102 |

Primary Examiner—Mathieu D. Vargot
Attorney, Agent, or Firm—John E. Thomas

[57] ABSTRACT

Surface characteristics of cast molded contact lenses are improved by removing substantially all the oxygen from the plastic mold pieces prior to casting the lenses.

21 Claims, No Drawings

METHOD FOR TREATING PLASTIC MOLD PIECES

BACKGROUND OF THE INVENTION

1. Field of the Invention

This invention relates to a method of treating plastic mold pieces used in cast molding contact lenses. More specifically, in one aspect, the present invention is directed to a method for removing oxygen from plastic mold pieces and, in another aspect, to a method of improving the surface characteristics of cast molded contact lenses polymerized by a free radical polymerization process.

2. Description of Art

The cast molding of contact lenses is well known. Typically, the monomer mix containing monomers capable of forming suitable polymers, crosslinkers, catalysts, polymerization initiators, and the like are mixed neat or mixed in suitable diluents or solvents and are placed into a female mold half. The male mold half is then pressed into the female mold half and the monomer mix is polymerized. The lenses obtained from this process conform to the shape of the cavity formed between the two mold halves and exhibit surface characteristics which correspond to the mold surfaces. After the lenses are cast, they are ready for further processing such as cleaning, polishing and/or edging and hydration, as necessary.

The mold pieces used in casting contact lenses are generally made of plastic materials which are substantially inert to the monomers employed and to the polymerization process employed. Typically, these plastic mold pieces are discarded after a single use.

Certain contact lenses manufactured by the cast molding process, particularly those known as hydrogels, have a noticeable frequency of cosmetic defects on their surfaces. As used herein, cosmetic defects is meant to describe sites or areas found on the surface of the lenses which can scatter light and which indicate the occurrence of an irregular surface area as compared to the rest of the lens surface. While these cosmetic defects cannot usually be seen by the naked eye, they do appear when examined under a slit lamp or magnification. Although these cosmetic defects are generally not associated with any medical or health concerns, they can lead to slight deficiencies in optimal visual performance of the lenses. Moreover, these cosmetic defects can be associated with processing, shipping and handling problems as lenses which contain these defects tend to more easily stick to themselves and to the packaging materials. Finally, improving the polymerization at the lens surfaces results in improved yields of acceptable lenses obtained from the cast molding process.

It has long been known that the presence of oxygen inhibits complete free radical polymerization. Accordingly, conventional cast molding processes are conducted in inert environments in order to eliminate the effects of oxygen on the polymerization process. These cast molding processes have been found adequate for overall polymerization resulting in a degree of polymerization of greater than about 99% of the bulk lens. Such cast molding techniques are widely used commercially.

However, it has now been found that oxygen may still have an effect on the free radical polymerization of the contact lens material even when the polymerization is conducted under inert atmospheric conditions. It has surprisingly been found that certain plastic mold pieces contain sufficient oxygen within the structural matrix of the plastic to adversely affect polymerization at the interface between the mold surface and the surface of the lens. It is believed that the oxygen migrates to the surface of the plastic mold piece during free radical polymerization and inhibits complete polymerization at the lens surface. The presence of oxygen is also believed to cause reduced crosslinking density at the lens surface. It is this incomplete polymerization or reduced crosslinking density at the lens surface which is believed to cause the cosmetic defects described above.

SUMMARY OF THE INVENTION

In accordance with this invention, it has now been found that removing substantially all of the oxygen from the thermoplastic resin prior to molding the plastic mold piece, removing substantially all the oxygen from the plastic mold piece after molding, or both, results in cast molded contact lenses with less cosmetic defects and more complete polymerization at the lens surface. Further, removing substantially all of the oxygen as described above increases the yield of acceptable contact lenses made from cast molding processes.

Accordingly, the present invention is a method for removing oxygen from plastic mold pieces comprising contacting the plastic resin with an inert gas for a period of time sufficient to remove substantially all of the oxygen prior to molding the plastic resin into plastic molded pieces having predetermined shapes. Alternatively, the oxygen can be removed by contacting the molded plastic mold piece with an inert gas for a period of time sufficient to remove substantially all of the oxygen. Moreover, the oxygen can be removed by the use of a vacuum in lieu of or in combination with contacting the thermoplastic resin or plastic mold piece with an inert gas. Preferably, the plastic resin and the plastic mold pieces will be contacted with inert gases and maintained in an inert environment prior to casting the lenses.

DETAILED DESCRIPTION OF THE INVENTION

The present invention is directed to improving the surface quality of contact lenses manufactured by cast molding processes using free radical polymerization techniques. Generally, the composition of the contact lenses, the molding process, and polymerization processes are well known and this invention is concerned primarily with treating the plastic mold pieces to achieve contact lenses with improved surface characteristics and decreased frequency of cosmetic defects. Of course, the invention can also be used to improve surface quality with any free radical polymerization process using plastic mold pieces to provide a predetermined shape to the final polymerized product.

The present invention can be used with all contact lenses such as conventional hard, soft and rigid gas permeable lenses and the composition of the monomer mix and the specific monomers used to form the lenses are not critical. The present invention is preferably employed with soft contact lenses such as those commonly referred to as hydrogel lenses prepared from monomers including but not limited to hydroxyethyl methacrylate, vinyl-pyrrolidone, glycerol methacrylate, methacrylic acid and acid esters. However, any combination of lens forming monomers capable of forming a polymer useful in making contact lenses may be used. Hydrophobic lens forming monomers may also be included such as those containing silicone moities. The degree of polymerization and/or the crosslinking density at the surface of the lens is believed to be improved in all contact lenses, even those which do not typically exhibit cosmetic defects. Thus, the term "contact lenses" as used herein includes hard, soft, and rigid gas permeable contact lenses as well as inocular lenses, lens blanks lathed into finished contact lenses, and other optical implants.

The monomer mix used in forming the contact lenses useful with this invention typically includes crosslinking agents, strengthening agents, free radical initiators and/or catalysts and the like as is well known in the art. Further, suitable solvents or dilueuts can be employed in the monomer mix, provided such solvents or diluents do not adversely affect or interfere with the polymerization process.

The method of polymerization or cure is not critical to the practice of this invention, except that this invention is limited to free radical polymerization systems as are well known in the contact lens art. Thus, the polymerization can occur by a variety of mechanisms depending on the specific composition employed. For example, thermal, photo, X-ray, microwave, and combinations thereof which are free radical polymerization techniques can be employed herein. Preferably, thermal and photo polymerizations are used in this invention with UV polymerization being most preferred.

Cast molding techniques are also well known. Generally, conventional cast molding techniques employ thermoplastic male and female mold halves of predetermined configuration which imparts the desired shape and surface configurations to the lenses formed therebetween. Examples of cast molding processes are taught in U.S. Pat. Nos. 4,113,224; 4,121,896; 4,208,364; and 4,208,365 which are fully incorporated herein by reference. Of course, many other cast molding teachings are available which can be used with the present invention providing the molds are made from thermoplastic materials.

As described above, the mold pieces used to cast contact lenses are generally made of plastic materials which provide the specific physical characteristics to the lenses. The plastic materials which can be employed with the present invention are thermoplastic which generally have high oxygen permeabilities. As mentioned above, it is believed that dissolved or free oxygen migrates through the plastic material and to the interface between the surface of the mold piece and the surface of the lens. It is the dissolved or free oxygen which is removed by this invention. The oxygen permeability of a polymeric material (a thermoplastic material) is an intrinsic property of that material and is defined as the amount of oxygen which transports across a film of the polymeric material having unit thickness subjected to unit driving force which is measured by the difference of partial pressure of the oxygen on the two sides of the film. Actual permeability values depend on the units used to express the mount of gas, thickness of the film and the driving force. The oxygen permeabilities of most common thermoplastic materials or resins are readily available and can be found in J. Brandrup and E. H. Immergud's *The Polymer Handbook*, 3rd ed., J. Wilely & Sons, 1989, which is incorporated herein by reference. It has been found that plastic materials having an oxygen permeability of greater than $0.035 \times 10^{-13}$ $$\frac{cm^3 \text{ gas at Standard Temperature and Pressure} \cdot cm}{cm^2 \cdot \text{Seconds} \cdot \text{Pascals}}$$

are useful with this invention. Preferably, the oxygen permeability of the plastic materials used herein will be greater than $0.035 \times 10^{-13}$ and most preferably greater than $1.0 \times 10^{-13}$ $$\frac{cm^3 \cdot STP \cdot cm}{cm^2 \cdot S \cdot Pa}.$$

The preferred plastic materials are those polymers and copolymers which contain predominantly polyolefins such as polyethylene and polypropylene, and polystyrene. Polypropylene is the most preferred plastic mold material.

The plastic mold pieces are generally injection molded from thermoplastic resins which are often in the form of pellets in finished metal master molds or dyes. However, the method of manufacturing the plastic mold pieces can vary according to any of the known techniques. Preferably, the resin will be injection molded under a substantially oxygen free atmosphere. Conventionally, injection molding techniques do not require removal of oxygen from the thermoplastic resin prior to molding. However, in accordance with one embodiment of this invention, the oxygen concentration is substantially removed by contacting the resin with an inert gas prior to molding.

Thus, one method of employing the present invention is to remove substantially all the oxygen from the resin by contacting the resin with an inert gas. While any inert gas can be employed to remove the oxygen from the resin, nitrogen is preferred because of its availability, safety, and cost. However, any inert gas such as argon or helium as well as carbon dioxide can be used. Moreover, the oxygen can be removed by the use of a vacuum.

It should be understood that it is preferred to remove substantially all of the oxygen from within the resin. While it is difficult to quantify the exact concentration of oxygen required for optimal polymerization at the lens surface, it is believed that about 51% to about 99% of the oxygen normally contained in the plastic material when at equilibrium in normal oxygen containing environments should be removed prior to casting the contact lenses. However, it may not be desirable to remove all of the oxygen. It is believed that excessive removal of oxygen may lead to difficulties in removing the lenses from the plastic mold pieces for certain thermoplastic materials. Thus, the presence of a slight amount of oxygen in the plastic mold piece may be desirable depending upon the composition of the plastic mold piece, the polymerization techniques and the overall cast molding process to obtain optimal release of the contact lenses from the molds during manufacture.

Accordingly, the amount of oxygen to be removed for any particular plastic mold piece depends on several variables such as plastic mold composition, lens composition, method of polymerization and the like. The mount of oxygen to be removed to achieve the desired degree of polymerization at the lens surface and optimal removal from the molds can be determined for any specific mold material by simple trial and error testing as will be apparent to and well within the skills of one skilled in the art. Preferably, the thermoplastic resin is placed in an inert environment or otherwise contacted with an inert gas for a period of about 2 to about 96 hours at ambient temperature and pressure. Of course, the duration of exposure to the inert gas can vary depending on the conditions of temperature and pressure selected. The use of elevated temperatures has been found to reduce the duration of exposure for polypropylene mold process.

It has also been found that the removal of oxygen from the plastic mold piece after the mold piece has been formed can be effectively employed either in addition to the removal of the oxygen from the resin as discussed above or in lieu of this earlier step. Generally, the removal of oxygen from the molded plastic mold piece when used alone requires placing the plastic mold piece in an inert environment for between about 10 and about 48 hours preferably for about 20 to 40 hours at ambient temperature and pressure depending on the thermoplastic materials employed. When the removal of oxygen from the molded plastic mold piece is used in conjunction with the first oxygen removal step, the plastic mold piece is contacted with the inert gas for a period of about 0.5 to about 6 hours, preferably 1 to 4 hours at ambient temperature and pressure. As mentioned above, a vacuum can be also used to remove the oxygen.

It is most preferred to employ both steps described above in preparing plastic mold pieces for use with this invention. In the most preferred embodiment of this invention, polypropylene resins are placed in an inert environment for a period of between 8 and 72 hours. The treated resins are then molded into the plastic mold pieces which are maintained in an inert environment for a period of about 0.5 and 4 hours. The plastic mold pieces are then moved directly into a cast molding process which is also conducted in an inert environment.

The following examples serve to illustrate certain embodiments of the invention.

EXAMPLES

Formation of Molds

Several batches of polypropylene resin used for making the plastic mold pieces of this invention were contacted with nitrogen for 12, 48 and 72 hours at ambient temperature and pressure as shown in Table I. A separate batch of resin was not treated as a control. Female and male polypropylene mold halves were prepared by injection molding in steel master molds. The nitrogen treated resin was used for the mold halves representing this invention and some of the untreated resin was used for the mold halves used as controls and the other untreated resin was used below. Mold halves made from the nitrogen treated resins were contacted with nitrogen to remove additional oxygen for between 0.5 to 6 hours at ambient temperature and pressure as shown in Table I. Some of the mold halves made from untreated resin were contacted with nitrogen to remove the oxygen for between 16 and 72 hours at ambient temperature and pressure.

Formation of Lenses

Lenses were polymerized in the treated and untreated polypropylene molds prepared above. Monomer mix consisting of 85% by weight 2-hydroxyethyl methacrylate, 15% by weight glycerin, 0.3% by weight ethylene glycol dimethacrylate, and 0.2% by weight benzoin methyl ether was placed in the cavity of the female mold halves and the male mold halves were inserted to displace excess monomer mix. Pressure was applied to the molds to ensure proper seating and the monomer mix was polymerized using UV energy. All female mold halves and all male mold halves had identical configurations and all polymerization conditions were identical. After cooling, the lenses were removed from the molds, hydrated, and packaged in plastic blister containers. After autoclaving, the lenses were removed from the blister packs and inspected for occurrence of cosmetic defect. The percent of cosmetic defects seen by optical comparator inspection are shown in Table I. The controls (lenses molded from untreated resin and plastic mold pieces) are designated as letters A–L. Each example below represents a lot of contact lenses containing from about 50 to about 200 lenses.

TABLE I

Cosmetic Defects in Cast Molded Contact Lenses

| *Example | Treatment (hrs.) Resin | Treatment (hrs.) Molds | % Defects |
|---|---|---|---|
| A | — | — | 24 |
| 1 | 48 | 2 | 0 |
| 2 | 48 | 2 | 0 |
| 3 | — | 72 | 0 |
| 4 | — | 72 | 0 |
| 5 | — | 72 | 0 |
| B | — | — | 53 |
| 6 | 12 | 2 | 6 |
| 7 | 12 | 2 | 10 |
| 8 | — | 24 | 0 |
| 9 | — | 24 | 4 |
| C | — | — | 11 |
| 10 | 12 | 3 | 0 |
| 11 | 12 | 3 | 0 |
| 12 | — | 24 | 0 |
| 13 | — | 24 | 0 |
| D | — | — | 52 |
| 14 | 12 | 3 | 4 |
| 15 | 12 | 3 | 0 |
| 16 | — | 16 | 0 |
| 17 | — | 16 | 0 |
| E | — | — | 28 |
| 18 | 12 | 3 | 0 |
| 19 | — | 24 | 0 |
| F | — | — | 41 |
| 20 | 48 | 2 | 0 |
| 21 | — | 48 | 0 |
| G | — | — | 39 |
| 22 | 12 | 3 | 0 |
| 23 | — | 24 | 0 |
| H | — | 62 | |
| 24 | 12 | 3 | 0 |
| 25 | — | 24 | 0 |
| I | — | — | 40 |
| 26 | 12 | 2.5 | 0 |
| 27 | — | 24 | 0 |
| J | — | — | 24 |
| 28 | 72 | 0.5 | 0 |
| 29 | — | 72 | 0 |
| K | — | — | 25 |
| 30 | 12 | 2.5 | 0 |
| 31 | — | 24 | 0 |
| L | — | — | 29 |
| 32 | 12 | 2 | 0 |
| 33 | — | 24 | 1 |

*One control lot was run for each series of test lots on a given day.

As shown in Table I, the contact lenses molded from plastic mold pieces in which the oxygen was removed have significantly less cosmetic defects than those molded from the untreated plastic mold pieces.

The present invention is not to be limited by the embodiments specifically disclosed herein. It should be understood that the scope of this invention includes all modifications, variations and equivalents which fall within the scope of the attached claims.

What is claimed:

1. A method for cast molding substantially cosmetic defect-free contact lenses in plastic mold pieces comprising:

contacting a thermoplastic resin having an oxygen permeability of greater than $0.035 \times 10^{-13}$ $$\frac{cm^3 \text{ gas} \cdot STP \cdot cm}{cm^2 \cdot S \cdot Pa}$$

with an inert gas for a time sufficient to remove substantially all of the oxygen from within the resin;

subsequently molding the resin into plastic mold pieces having a predetermined shape; and cast molding contact lenses in the plastic mold pieces.

2. The method of claim 1 wherein the resin is contacted with an inert gas for a period from about 2 to about 96 hours at ambient temperature and pressure.

3. The method of claim 2 further comprising contacting the plastic mold piece with an inert gas for a period from about 0.5 to about 6 hours at ambient temperature and pressure prior to casting the lenses.

4. The method of claim 3 wherein the plastic mold piece has an oxygen permeability of greater than $0.35 \times 10^{-13}$ $$\frac{cm^3 \, gas \cdot STP \cdot cm}{cm^2 \cdot S \cdot Pa}.$$

5. The method of claim 1 wherein the resin is a polyolefin.

6. The method of claim 5 wherein the resin is polypropylene.

7. In a process for cast molding substantially cosmetic defect-free contact lenses comprising casting the lenses between two plastic mold pieces having an oxygen permeability of greater than $0.035 \times 10^{-13}$ $$\frac{cm^3 \, gas \cdot STP \cdot cm}{cm^2 \cdot S \cdot Pa}$$

using a free radical polymerization process, the improvement comprising removing substantially all of the oxygen from the plastic mold pieces prior to casting the contact lenses.

8. The process of claim 7 wherein the oxygen is removed by contacting a thermoplastic resin used to make the plastic mold pieces with an inert gas prior to molding the plastic mold pieces.

9. The process of claim 8 wherein the oxygen is removed by contacting the resin with an inert gas for between about 2 and about 96 hours at ambient temperature and pressure.

10. The process of claim 9 wherein the plastic mold pieces are contacted with an inert gas for between about 0.5 and about 6 hours at ambient temperature and pressure.

11. The process of claim 10 wherein the plastic mold pieces are made of a polyolefin.

12. The process of claim 11 wherein the plastic mold pieces are made of polypropylene.

13. The process of claim 7 wherein the oxygen is removed by contacting the plastic mold pieces with an inert gas.

14. The process of claim 13 wherein the oxygen is removed by contacting the plastic mold pieces with an inert gas for between about 10 to about 48 hours at ambient temperature and pressure.

15. The process of claim 7 wherein the oxygen is removed by use of a vacuum.

16. The process of claim 14 wherein the plastic mold pieces are made of a polyolefin.

17. The process of claim 16 wherein the plastic mold pieces are made of a polypropylene.

18. A method for cast molding substantially cosmetic defect-free contact lenses comprising:

contacting plastic mold pieces having an oxygen permeability of greater than $0.035 \times 10^{-13}$ $$\frac{cm^3 \, gas \cdot STP \cdot cm}{cm^2 \cdot S \cdot Pa}$$

with an inert gas for a period sufficient to remove substantially all the oxygen from within the plastic mold pieces; and subsequently casting contact lenses in the mold pieces.

19. The method of claim 18 wherein the plastic mold pieces are contacted with an inert gas for between about 10 and about 48 hours at ambient temperature and pressure.

20. The method of claim 19 wherein the plastic mold pieces are made of a polyolefin.

21. The method of claim 20 wherein the polyolefin is polypropylene.

\* \* \* \* \*